United States Patent

Von Sybel et al.

[15] 3,646,862
[45] Mar. 7, 1972

[54] PHOTOGRAPHIC APPARATUS WITH DOUBLE EXPOSURE PREVENTING MEANS

[72] Inventors: Reinhard Von Sybel, Krailling; Dieter Engelsmann; Gunter Fauth, both of Unterhaching, all of Germany

[73] Assignee: Agfa-Gevaert Aktiengesellschaft, Leverkusen, Germany

[22] Filed: Mar. 4, 1970

[21] Appl. No.: 16,307

[30] Foreign Application Priority Data

Mar. 7, 1969 Germany..................P 19 11 774.9

[52] U.S. Cl..................95/31 AC, 95/31 FL, 95/53 EB
[51] Int. Cl...................G03b 9/68, G03b 9/62, G03b 17/42
[58] Field of Search..............95/31 FL, 31 EL, 53 EB, 53 R, 95/60, 31 AC

[56] References Cited

UNITED STATES PATENTS 3,489,070  1/1970  Fauth..................................95/31 R
3,479,935  11/1969 Harvey.........................95/53 EB UX
3,249,034  5/1966  Burgarella.....................95/53 EB UX

FOREIGN PATENTS OR APPLICATIONS 269,637  3/1969  Austria................................95/53 EB

*Primary Examiner*—Samuel S. Matthews
*Assistant Examiner*—Russell E. Adams, Jr.
*Attorney*—Michael S. Striker

[57] ABSTRACT

A still camera wherein a spring-biased bolt is free to move in response to actuation of the camera release to assume a position in which it prevents renewed actuation of the release. The bolt is moved from such position in response to transport of the film by the length of a frame to thereby stress a spring which propels it in response to renewed actuation of the release whereby an impeller of the bolt opens the leading blade of the shutter which thereupon remains in open position at least until the release reassumes its idle position. The trailing shutter blade is permitted to close and to thus complete the exposure with a delay which is determined by a retard mechanism or by an electrical circuit as a function of scene brightness.

24 Claims, 6 Drawing Figures

INVENTORS
REINHARD v. SYBEL
DIETER ENGELSMANN
GÜNTER FAUTH

PHOTOGRAPHIC APPARATUS WITH DOUBLE EXPOSURE PREVENTING MEANS

BACKGROUND OF THE INVENTION

The present invention relates to photographic apparatus in general, and more particularly to improvements in photographic apparatus of the type wherein the camera release can be actuated only once subsequent to transport of the film by the length of a frame to thus prevent double exposure of film frames. Still more particularly, the invention relates to photographic cameras of the type wherein a double exposure preventing member is movable under the action of resilient means in response to actuation of the camera release to assume a predetermined position in which it prevents repeated actuation of the release and wherein the double exposure preventing member is movable from such position in response to operation of the film-transporting mechanism to arrest the latter upon completion of transport of the film by the length of a frame and to thereby permit renewed actuation of the release. In such photographic cameras, the double exposure preventing member preferably performs the additional function of effecting opening of the shutter during movement from its predetermined position.

SUMMARY OF THE INVENTION

An object of the present invention is to provide a photographic apparatus with double exposure preventing means wherein the double exposure preventing means can perform at least one but preferably several additional functions, such as cooperating with exposure control means to insure automatic termination of exposure in dependency on scene brightness.

Another object of the invention is to provide a photographic camera, particularly a still camera, with double exposure preventing means which can cooperate with mechanical or electrical means for determining the exposure time and/or aperture size as a function of scene brightness and wherein the movable parts are subjected to negligible wear.

A further object of the invention is to provide a novel and improved automatic photographic camera which comprises double exposure preventing means and a simple, compact and relatively inexpensive structure for insuring that the exposure values are determined in dependency on the intensity of scene light.

An additional object of the invention is to provide the above outlined camera with a shutter which is simpler than but just as effective as a curtain-type shutter and is capable of preventing dynamic vignetting as well as of closing its blades in automatic response to elapse of a predetermined interval of time or in response to elapse of an interval of time which is best suited to insure a satisfactory exposure at a particular scene brightness.

A further object of the invention is to provide a novel operative connection between the shutter and the double exposure preventing means of an automatic or semiautomatic still camera.

Another object of the invention is to provide a photographic camera wherein at least one of the shutter blades need not be maintained under spring bias.

The invention is embodied in a photographic apparatus, preferably a still camera, which comprises a camera release actuatable to move from an idle position and preferably tending to assume such idle position, a film transporting device including a lever or a wheel which is operable to advance the film upon completion of an exposure, a double exposure preventing member which is movable by the film transporting device from a first position in which it prevents actuation of the release to a second position in which it prevents operation of the film transporting device (preferably upon completion of film transport by the length of a frame), a helical spring or analogous means for moving the double exposure preventing member from second position in response to actuation of the release, shutter means including a leading blade which is arranged to move from closed to open position in response to movement of the double exposure preventing member from second position and a trailing blade, holding means provided on or integral with the double exposure preventing member for retaining the leading blade in open position at least while the camera release is out of idle position, blocking means for holding the trailing blade in open position in the second position of the double exposure preventing member, and time delay means (e.g., an adjustable mechanical retard mechanism or an electronic exposure control circuit) arranged to effect movement of the trailing blade to closed position and to thus complete an exposure subsequent to movement of the leading blade to open position.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
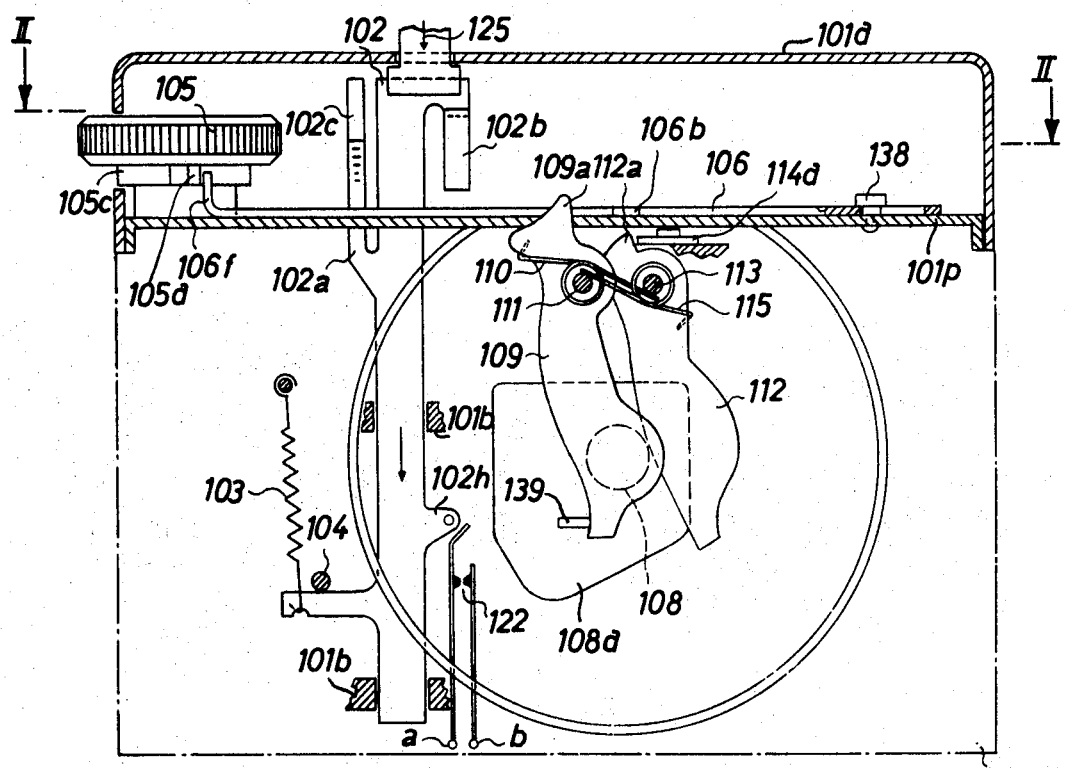
FIG. 1 is a schematic longitudinal vertical sectional view of a photographic apparatus which embodies one form of the invention.
Figure 2:
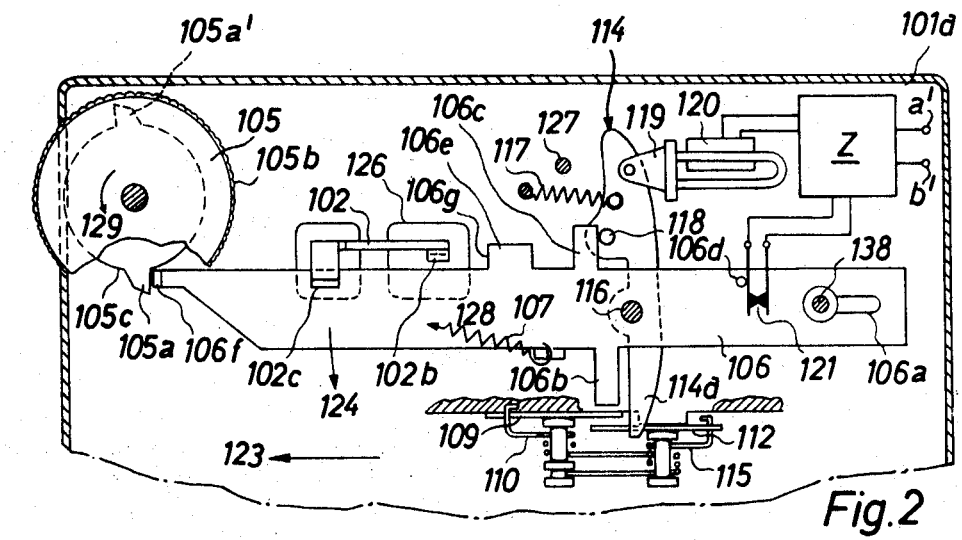
FIG. 2 is a fragmentary horizontal sectional view substantially as seen in the direction of arrows from the line II—II of FIG. 1.

Referring first to FIGS. 1 and 2, there is shown a still camera which comprises a housing or body 101 whose top portion 101a is provided with an opening for the outer end portion or knob of a vertically reciprocable release in the form of a slide 102 guided in bearings 101b. A helical spring 103 biases the slide 10 to the retracted or idle position shown in FIG. 1 in which an arm of the slide abuts against a stop 104. A further arm or extension 102a of the slide 102 is inwardly adjacent to the knob and is located opposite a third arm 102b. The top portion 101a of the housing is further provided with a lateral opening for a portion of a wheel 105 forming part of the film-transporting mechanism; this wheel can be replaced with a customary lever. The wheel 105 is provided with a cam face or guide face 105c, with two projections or teeth 105a, 105a' which are located diametrically opposite each other, and with a milled or knurled peripheral surface 105b which facilitates rotation in a direction (arrow 129) to transport the film lengthwise from a supply reel to a takeup reel, not shown. The cam face 105c and the teeth 105a, 105a' of the wheel 105 can cooperate with the upwardly bent front end portion or tip 106f of a double exposure preventing member here show as a slidable bolt 106 which constitutes a means to prevent excessive lengthwise transport of film, a means to prevent repeated movement of the slide 102 from idle position prior to transport of the film by the length of a frame, and also a means for opening the shutter. The bolt 106 is biased by a resilient element here shown as a helical spring 107 which tends to move it away from the illustrated right-hand end position in which a guide pin 138 in the housing 101 abuts against the surface at the left-hand end of an elongated slot 106a in the bolt. The slot 106a and the guide pin 138 permit lengthwise as well as pivotal movements of the bolt 16. The latter is further provided with a projection or lug 106b which extends forwardly (i.e., downwardly, as viewed in FIG. 2) and constitutes an impeller serving to propel to open position a leading shutter blade 109 which is biased by a torsion spring 110 so that it normally tends to assume a closed position (shown in FIG. 1) in which it overlies an exposure aperture 108 provided in a plate 108a which is installed in the housing 101 behind the picture taking objective (not shown). As will be explained later, the impeller 106b also constitutes a holding means for maintaining the leading shutter blade 109 in open position at least while the slide 102 is out of the idle position shown in FIG. 1. The shutter blade 109 is pivotable on a horizontal shaft 111 and is provided with an extension or arm 109a which extends into the path of movement of the impeller or holding means 106b on the bolt 106. When the latter is permitted to follow the bias of the spring 107 (in response to depression of the slide 102), the impeller 106b strikes against the arm 109a and propels the leading shutter blade 109 to open position to thereby stress the spring 110. The shutter further comprises a second or trailing blade 112 which is pivotable on a shaft 113 and has an arm 112a which is normally held in the position shown in FIG. 1 by one arm 114a of a blocking element here shown as a two-armed lever 114. In such open position, the trailing shutter blade 112 is out of registry with the exposure aperture 108. A second torsion spring 115 biases the trailing blade 112 toward closed position. The springs 110, 115 are respectively convoluted on the shafts 111, 113.

The blocking lever 114 is pivotable on a pin 116 which is mounted in the housing 101. It is not necessary that the trailing shutter blade 112 be held in open position directly by the blocking lever 114, i.e., the latter can be connected with a suitable pawl or the like (not shown) which performs the same or similar function as the lower arm 114a of the lever 114 (reference being had to FIG. 2). The other arm of the blocking lever 114 is biased by a helical spring 117 which urges a stud 118 of the blocking lever against a projection or stop 106c of the bolt 106. The blocking lever 114 is articulately coupled with a link 119 which constitutes the armature of a retaining means here shown as an electromagnet 120 forming part of an exposure control circuit Z of known design. FIG. 2 shows the lever 114 in blocking position in which its arm 114a holds the arm 112a of the trailing blade 112 in open position. The lever 114 is held in such blocking position by the projection 106c of the bolt 106.

The bolt 106 is further provided with an actuating pin or trip 106d which maintains in closed position an electric switch 121 whenever the bolt dwells in the end position shown in FIG. 2. The switch 121 is installed in the exposure control circuit Z which latter constitutes a time delay device for the electromagnet 120. A normally open master switch 122 is adjacent to a trip 102h of the slide 102 and is closed in automatic response to depression of the slide. The terminals a, b of the master switch 122 are connected to the terminals a', b' of the exposure control circuit Z. The purpose of the master switch 122 is to connect the components of the exposure control circuit Z with an energy source (not shown) e.g., one or more batteries or miniature cells, and to thus energize the electromagnet 120.

A further projection or lug 106e of the bolt 106 is adjacent to a median portion of the slide 102. This projection 106e serves as a means for preventing movement of the slide 102 from idle position after the bolt 106 is permitted to follow the bias of the spring 107 and to move in a direction indicated by the arrow 123. The projection 106e is then located in the path of the arm 102b and prevents displacement of the slide 102 in the direction indicated by arrow 125. The purpose of teeth 105a, 105a' on the film transporting wheel 105 is to engage with the tip 106f of the bolt 106 and to return the latter to the illustrated end position whereby the bolt reaches such end position at the exact time when the wheel 105 completes the transport of photographic film by the length of a frame. The numeral 127 denotes a stop post for the blocking lever 114. The arm 102a of the slide 102 has a cam face 102c which can pivot the bolt 106 in the direction indicated by arrow 124 to thereby disengage the tip 106f from the adjacent tooth 105a and to thus enable the spring 107 to propel the bolt in the direction indicated by arrow 123. A horizontal partition 101p of the housing 101 is provided with an opening 126 for the arm 102b of the slide 102. In order to transport the film forwardly, the wheel 105 must be rotated in the direction indicated by the arrow 129. The arrow 128 indicates the direction in which the spring 107 tends to move the bolt 106 from the illustrated end position; such direction has been selected for the purpose of insuring that the tip 106f is urged toward the cam face 105c of the wheel 105 as soon as it has been caused (by cam face 102c) to clear the adjacent tooth 105a.

Each of the teeth 105a, 105a' on the film transporting wheel 105 constitutes an abutment which can hold the bolt 106 in the end position shown in FIG. 2 upon completed transport of the film by the length of a frame and in idle position of the slide 102. It is clear that the camera can be provided with a fixed abutment (not shown) which holds the bolt 106 in the end position of FIG. 2 upon completed transport of film by the length of a frame and which can be cleared by the tip 106f when the bolt 106 is caused to pivot on the guide pin 138 (arrow 124) in response to movement of the slide 102 from its idle position.

When the leading shutter blade 109 is held in the closed position of FIG. 1, it abuts against a stop post 139.

The operation:

When the user of the camera wishes to make an exposure, the knob of the slide 102 is depressed in the direction indicated by arrow 125 whereby the spring 103 stores energy and the trip 102h of the slide closes the master switch 122. Prior to depression of the slide 102, the bolt 106 dwells in the end position shown in FIG. 2 in which its rear edge face extends into the path of movement of the cam face 102c on the arm 102a but the projection 106e is out of registry with the arm 102b so that the latter can enter the opening 126 in the partition 101p. As the slide 102 moves downwardly, the cam face 102c of the arm 102a engages the rear edge face of the bolt 106 and pivots it on the guide pin 138 in the direction indicated by arrow 124. This moves the tip 106f of the bolt 106 radially of the wheel 105 and away from the adjacent radial flank of the tooth 105a so that the spring 107 is free to contract and tends to propel the bolt in the direction indicated by arrow 128. However, the top land of the adjacent tooth 105a compels the bolt 106 to move in the direction indicated by arrow 123. The rear edge face of the bolt 106 slides along the cam face 102c of the arm 102a. The spring 107 is strong enough to abruptly propel the bolt 106 toward the other end position (initially through a distance which is somewhat less than the length of the slot 106a) whereby the impeller 106b strikes against the arm 109a of the leading shutter blade 109 to move the latter toward open position so that the aperture 108 can admit scene light to an unexposed frame of the film. The projection 106c of the bolt 106 moves away from the stud 118 on the blocking lever 114 but the latter is not free to follow the action of the spring 117 and to thus permit movement of the trailing shutter blade 112 to closed position to complete the exposure because the electromagnet 120 is energized as soon as the master switch 122 closes. Furthermore, the trip 106d of the bolt 106 has moved away from the adjacent contact of the switch 121 so that the latter opens and thereby furnishes to the exposure control circuit Z a starting signal. The exposure control circuit Z is a well known electronic time delay circuit which includes a photosensitive receiver arranged to effect deenergization of the electromagnet 120 with a delay which is a function of scene brightness. The photosensitive receiver is in circuit with a customary capacitor and is exposd exposed to scene light. The arrangement is such that the electromagnet 120 is deenergized with little delay if the intensity of scene light is high and with greater delay when the intensity of scene light is low.

The bolt 106 comes to a halt when the shoulder 106g of its projection 106e strikes against the arm 102b of the slide 102. The pin 138 is then located close to the right-hand end of the slot 106a. When the bolt 106 reaches such intermediate position, its impeller 106b holds the leading shutter blade 109 in open position. The shutter is closed with a delay which is determined by the exposure control circuit Z as a function of scene brightness. Such closing takes place in response to deenergization of the electromagnet 120 which then permits the spring 127 to contract and to move the blocking lever 114 against the stop post 127. The blocking lever 114, in turn, permits the spring 115 to move the trailing shutter blade 112 to closed position.

When the operator releases the knob of the slide 102, the spring 103 contracts and returns the slide to the idle position shown in FIG. 1. The trip 102h permits the master switch 122 to open and to disconnect the energy source from the electromagnet 120. As soon as the arm 120b moves above and away from the shoulder 106g, the spring 107 is again free to move the bolt 106 (arrow 123) to the extent determined by the length of the slot 106a whereby the projection 106e moves into the path of the arm 102b and prevents renewed depression of the slide 102. At the same time, the spring 107 pivots the bolt 106 in a clockwise direction, as viewed in FIG. 2 (counter to the direction indicated by arrow 124), so that the tip 106f moves against the cam face 105c of the wheel 105. In such position of the bolt 106, the slide 102 is locked in retracted position but the wheel 105 is free to rotate in a counterclockwise direction (arrow 129) to transport the film lengthwise.

While the bolt 106 pivots counter to the direction indicated by the arrow 124, its impeller 106b moves away from the arm 109a so that the spring 110 is free to return the leading shutter blade 109 to the closed position shown in FIG. 1. Thus, the exposure aperture 108 is overlapped by both shutter blades because the lever 114 still abuts against the stop post 127.

Prior to making a fresh exposure, the operator must rotate the wheel 105 (arrow 129) whereby the radial flank of the other tooth 105a' approaches and ultimately engages the tip 106f of the bolt 106. Further anticlockwise rotation of the wheel 105 causes the bolt 106 to move back to the end position shown in FIG. 2 and to arrest the wheel 105 at the exact moment when a fresh film frame registers with the exposure aperture 108. Such return movement of the bolt 106 causes its projection 106c to engage the stud 118 and to pivot the blocking lever 114 to the blocking position shown in FIG. 2 whereby the arm 114a of the lever 114 returns the trailing shutter blade 112 to open position. The film is not exposed because the leading shutter blade 109 remains in closed position. The trip 106d closes the switch 121 and the spring 107 is stressed so that the camera is ready to make the next exposure in response to depression of the slide 102. Such depression is possible because the projection 106e is moved away from the path of the arm 102b.

It will be noted that the leading shutter blade 109 remains in open position as long as the slide 102 is held out of its idle position. Thus, the blade 109 can reassume the closed position of FIG. 1 only after the cam face 102c on the arm 102a of the slide 102 rises sufficiently above the rear edge face of the bolt 106 so that the spring 107 is free to pivot the bolt in a clockwise direction, as viewed in FIG. 2, in order to move the tip 106f against the cam face 105c and to move the impeller 106b away from the arm 109a. The spring 110 is thereupon free to pivot the blade 109 in a clockwise direction against the stop post 139.

The blocking lever 114 maintains the trailing shutter blade 112 in open position when the bolt 106 assumes the end position shown in FIG. 2. As explained above, the bolt 106 releases the blocking lever 114 to the action of the spring 117 as soon as it leaves the end position of FIG. 2; however, the lever 114 thereupon remains in blocking position as long as the electromagnet 120 remains energized.

When the bolt 106 dwells in the end position shown in FIG. 2, the impeller 106b is spaced from the arm 109a of the leading shutter blade 109 so that the spring 110 is free to maintain this blade in contact with the stop post 139.

An advantage of the feature that the impeller 106b is disengaged from the arm 109a of the leading shutter blade 109 when the tip 106f is free to engage the cam face 105c is that both blades can overlie the exposure aperture 108 after the electromagnet 120 permits movement of the trailing blade 112 to closed position and before the user of the camera rotates the wheel 105 to transport the film and to simultaneously return the bolt 106 to the end position of FIG. 2. This is particularly desirable when the camera is loaded with highly sensitive film.

Figure 3:
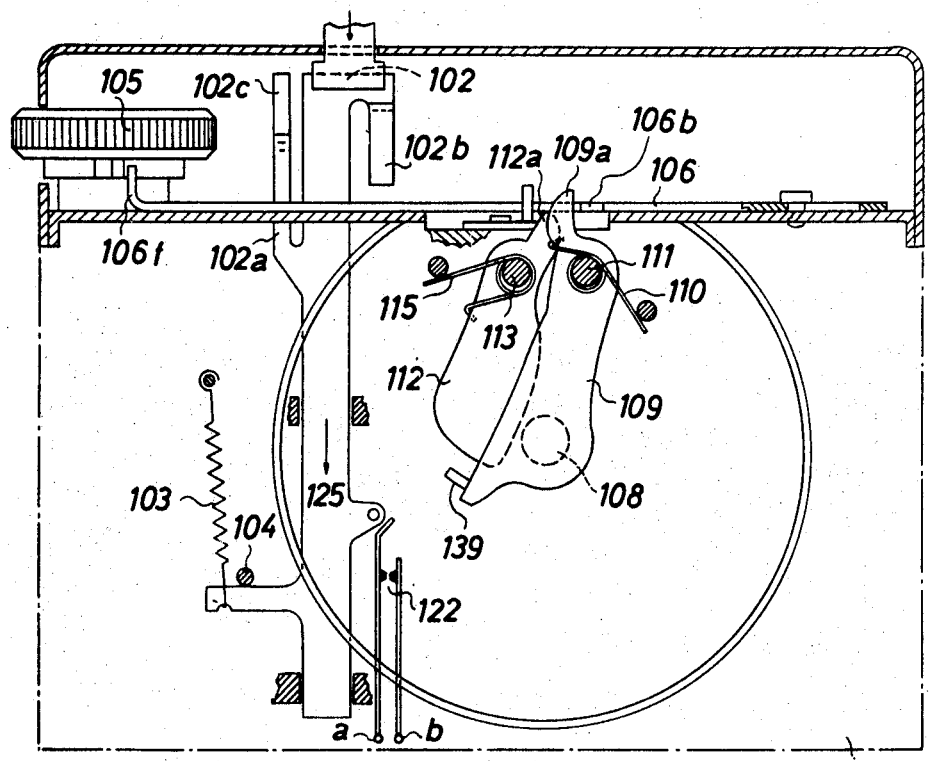
FIG. 3 is a schematic longitudinal vertical sectional view of a second photographic apparatus.

The camera of FIG. 3 is similar to that of FIGS. 1 and 2. The main difference is that, during the making of an exposure, both shutter blades move in the same direction. Thus, when the slide 2 is depressed to release the bolt 106 to the action of the spring 107, the impeller 106b propels leading shutter blade 109 in a counterclockwise direction, as viewed in FIG. 3, and the spring 115 is thereupon free to pivot the trailing shutter blade 112 in the same (counterclockwise) direction to complete the exposure with a delay which is determined by the exposure control circuit (not shown in FIG. 3). An advantage of such mounting of the shutter blades 109, 112 is that the shutter operates not unlike a curtain-type shutter and that the blades thus prevent dynamic vignetting. The manner in which the blocking lever 114 (not shown in FIG. 3) normally holds the arm 112a of the trailing shutter blade 112 in the position shown in FIG. 3 is the same as described in connection with FIGS. 1 and 2.

Figure 4:
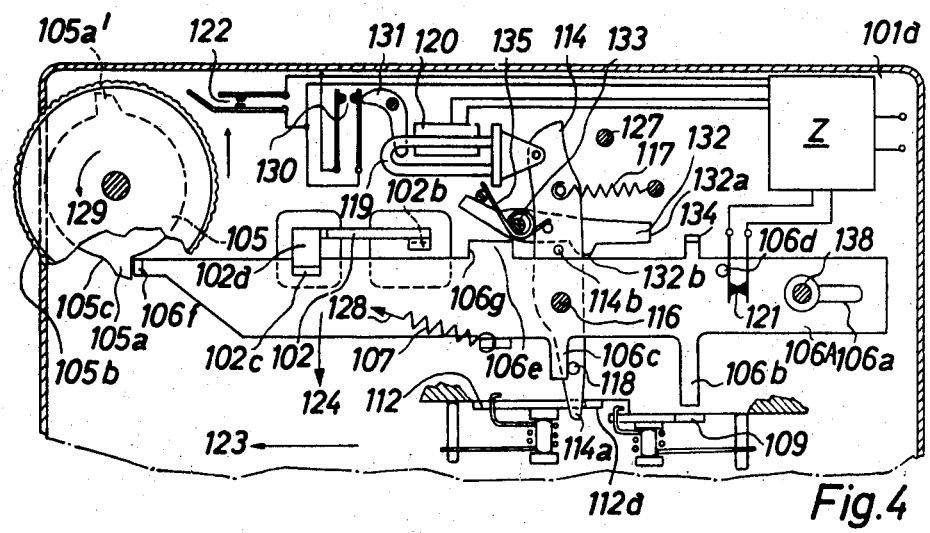
FIG. 4 is a horizontal sectional view of a portion of a third apparatus.

The construction of the camera shown in FIG. 4 is also similar to that of the previously described cameras. This camera comprises an arresting lever 132 which is pivotable on a fixed pin 133 into and away from the path of a projection 134 on the bolt 106A. A torsion spring 135 is provided to bias the arm 132a of the arresting lever 132 into the path of movement of the projection 134. A lobe 132b of the arresting lever 132 can be engaged by a post 114b on the blocking lever 114A to move the arm 132a away from the path of the projection 134. A further lever 131 is pivotable by the electromagnet 120 to open or close an auxiliary switch 130 which is connected in parallel with the master switch 122.

The operation:

When the slide 102 is depressed, the cam face 102c of the arm 102a engages the rear edge face of the bolt 106A to move the tip 106f away from the radial flank of the tooth 105a (arrow 124). The spring 107 immediately propels the bolt 106A in the direction indicated by the arrow 123. The spring 135 holds the arresting lever 132 in such position that the arm 132a extends into the path of the projection 134 and arrests the bolt 106A in an intermediate position in which the tip 106f is outwardly adjacent to and abuts against the top land of the tooth 105a. The movement of the bolt 106A from the illustrated end position to the intermediate position in which the projection 134 engages the arm 132a of the arresting lever 132 suffices to enable the impeller 106b to move the leading shutter blade 109 to open position.

Depression of the slide 102 also results in closing of the master switch 122 which connects the exposure control circuit Z with the energy source and causes energization of the electromagnet 120. Also, the movement of bolt 106A from the illustrated end position to the aforementioned intermediate position suffices to effect opening of the switch 121 (trip 106d) to thus transmit to the circuit Z a starting impulse. An exposure control circuit which can be used in the photographic apparatus of the present invention is disclosed, for example, in our U.S. Pat. No. 3,429,244 granted to von Wasielewski on Feb. 25, 1969 and assigned to the same assignee.

When the slide 102 is released, the spring 103 (not shown) is free to contract and the master switch 122 opens. However, the energized electromagnet 120 causes the lever 131 to maintain the auxiliary switch 130 in closed position so that the opening of master switch 122 has no immediate effect on the condition of the electromagnet. On return movement of the slide 102 toward idle position, the spring 107 is free to pivot the bolt 106A in a direction counter to that indicated by the arrow 124 so that the tip 106f can engage with the top land of the tooth 105a. The arm 112a of the trailing shutter blade 112 engages the arm 114a of the blocking lever 114A which is held in blocking position by the armature 119 of the energized electromagnet 120. The latter is deenergized with a delay which is a function of scene brightness so that the spring 117 is free to turn the lever 114A on the pin 116 in a clockwise direction, as viewed in FIG. 4, whereby the post 114b engages the lobe 132b and pivots the arm 132a of the arresting lever 132 away from engagement with the projection 134 of the bolt 106A. Thus the spring 107 is free to contract and moves the bolt 106A to its left-hand end position. The tip 106f of the bolt 106A is bent upwardly (toward the observer of FIG. 4) so that further movement of the bolt 106A in the direction indicated by the arrow 123 enables the tip 106f to clear the tooth 105a so that the bolt is free to pivot in a clockwise direction and to move the tip 106f against the cam face 105c.

When the lever 114A is pivoted by the spring 117, its arm 114a permits the spring 115 to move the trailing shutter blade 112 to closed position to thereby complete the exposure. Also, when the spring 107 is free to pivot the bolt 106A in a clockwise direction to move the tip 106f into engagement with the cam face 105c, the impeller 106b moves out of the path of movement of the arm of the leading blade 109 so that the spring 110 is free to return the blade 109 to closed position. The blade 109 then abuts against the stop 139 (shown in FIGS. 1 and 3). The auxiliary switch 130 opens in response to deenergization of the electromagnet 120 so that the circuit Z is disconnected from the energy source. The manner in which the bolt 106A is returned to the illustrated end position is the same as described in connection with FIGS. 1 and 2.

An advantage of the auxiliary switch 130 is that the electromagnet 120 remains connected with the energy source even after the slide 102 returns to idle position and permits opening of the master switch 122. This is particularly important for making of exposures with very long exposure time. The lever 131 insures that the switch 130 remains closed until the electromagnet 120 is deenergized after elapse of the interval which begins on opening of the switch 121 and terminates at a moment which is determined by the circuit Z as a function of scene brightness.

Another advantage of the camera shown in FIG. 4 is that both shutter blades move to closed positions at the same time to thereby further reduce the likelihood of uncontrolled entry of light. This is due to the fact that, when the electromagnet 120 permits the blocking lever 114A to move under the action of the spring 117 (closing of the trailing blade 112), the post 114b strikes against the lobe 132b and disengages the arm 132a of the arresting lever 132 from the projection 134 so that the bolt 106A can leave its intermediate position and pivots counter to the direction indicated by arrow 124 to disengage the impeller 106b from the arm of the leading blade 109 which is then free to return into abutment with the stop post 139 under the action of the torsion spring 110. Such simultaneous movement of blades 109, 112 results in very rapid closing of the shutter.

When the bolt 106A dwells in the aforementioned intermediate position in which the arm 132a of the arresting lever 132 abuts against the projection 134, the leading shutter blade 109 bears against the impeller 106b under the action of the spring 110 and thus remains in open position until the blocking lever 114A moves the arm 132a away from the projection 134. Thus, the blade 109 can remain in open position while the slide 102 moves back toward and reassumes the idle position, as long as the electromagnet 120 remains energized.

Figure 5:
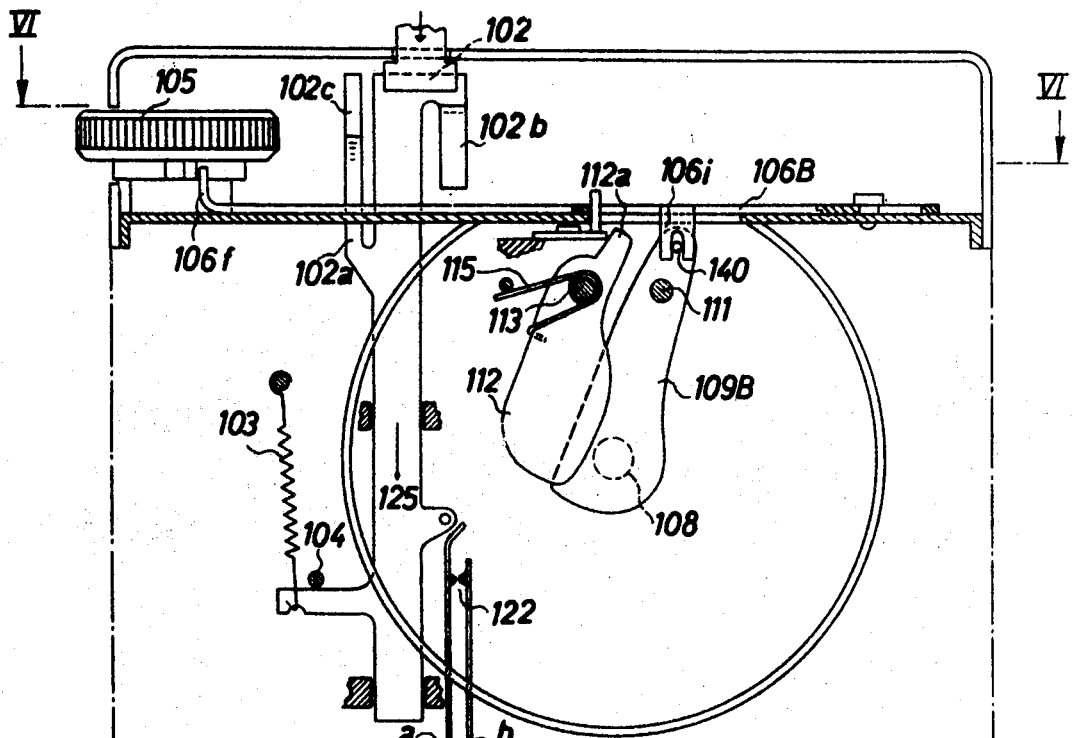
FIG. 5 is a schematic longitudinal vertical sectional view of a fourth apparatus.
Figure 6:
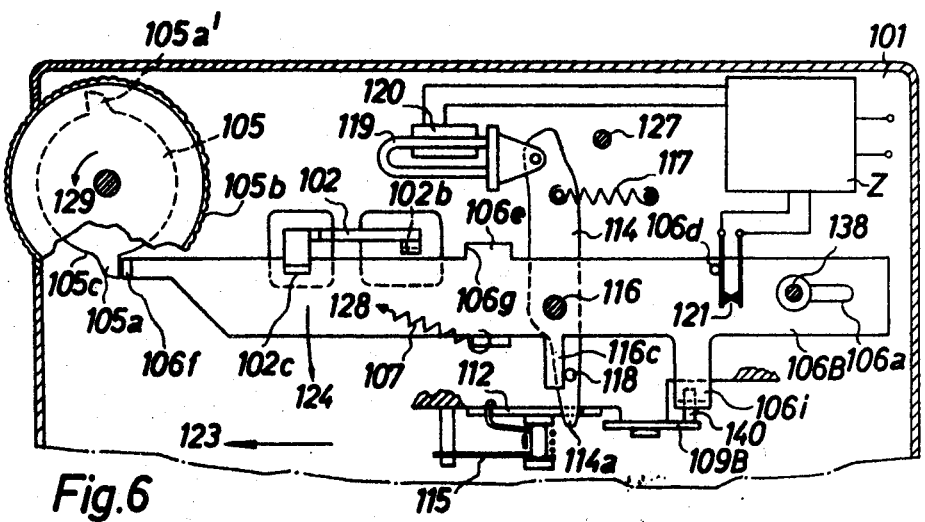
FIG. 6 is a fragmentary horizontal sectional view substantially as seen in the direction of arrows from the line VI—VI of FIG. 5.

The camera of FIGS. 5 and 6 is also similar to the aforedescribed cameras and many of its parts are denoted by similar reference characters. The bolt 106B is provided with a downwardly extending U-shaped projection or lug 106i defining an open slot for a pin 140 on the leading shutter blade 109B. Thus, the blade 109B is positively but articulately connected to the bolt 106B so that the angular position is always a function of the position of the bolt. When the bolt 106B leaves the illustrated right-hand end position, the projection 106i (which constitutes a modified impeller) propels the leading shutter blade 109B to open position. The blade 109B is returned to closed position in response to rotation of the film transporting wheel 105, i.e., when the tip 106f is engaged by the tooth 105a' to return the bolt 106B to the illustrated end position. An advantage of the camera shown in FIGS. 5 and 6 is that the torsion spring 110 of FIGS. 1 to 4 can be dispensed with. Otherwise, the operation of the camera shown in FIGS. 5 and 6 is analogous to that of the aforedescribed cameras.

The improved camera can be further modified in a number of ways without departing from the spirit of our invention. For example, the blades of the shutter can be mounted for pivotal movement about a common axis. Also, the double exposure preventing bolt or another part of the camera can close a synchronizing switch to fire a flash bulb or to complete the circuit of an electronic flash at the exact time when the blades provide a maximum opening for entry of scene light. Furthermore, the circuit Z can be replaced with an adjustable retard mechanism which then serves to determine the length of interval during which the electromagnet 120 remains energized subsequent to opening of the switch 121 or which is directly connected with the blocking lever 114 or 114A to permit its movement under the action of the spring 117 after elapse of a selected interval of time. Still further, the link 119 can be omitted, i.e., one arm of the blocking lever 114 or 114A can constitute the armature of the electromagnet 120.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended

1. In a photographic apparatus, a combination comprising a release actuatable to move from an idle position; a film transporting device operable to advance the film upon completion of an exposure; a double exposure preventing member movable by said device from a first position in which it prevents the actuation of said release to a second position in which it prevents the operation of said device; means for moving said member from said second position in response to actuation of said release; shutter means including a leading blade arranged to move from a closed position to an open position in response to movement of said member from said second position and a trailing blade movable with reference to said member between open and closed positions, said member including holding means for retaining said leading blade in said open position at least while said release is out of said idle position, blocking means movable to and from a blocking position in which it maintains said trailing blade in said open position, said member having means for maintaining said blocking means in said blocking position in said second position of said member; and time delay means arranged to effect the movement of said blocking means from said blocking position and to thus effect the movement of said trailing blade to said closed position with attendant completion of an exposure subsequent to movement of said leading blade to said open position.

2. A combination as defined in claim 1, wherein said means for moving the double exposure preventing member from second position comprises resilient means which stores energy during movement of said member from first to second position, said blocking means comprising a blocking element movable to and from said blocking position in which it maintains said trailing blade in open position and in which it is held by said member in the second position thereof, said time delay means comprising retaining means for temporarily holding said blocking element in blocking position following the movement of said member from said second position.

3. A combination as defined in claim 2, wherein said holding means includes an impeller provided on said double exposure preventing member and arranged to propel said leading blade to open position in response to sudden movement of said member from second position under the action of said resilient means.

4. In a photographic apparatus, a combination comprising a release actuatable to move from an idle position; a film-transporting device operable to advance the film upon completion of an exposure; a double exposure preventing member movable by said device from a first position in which it prevents the actuation of said release to a second position in which it prevents the operation of said device; means for moving said member from said second position in response to actuation of said release; shutter means including a leading blade arranged to move from a closed position to an open position in response to movement of said member from said second position and a trailing blade, said member including holding means for retaining said leading blade in said open position at least while said release is out of said idle position and said shutter means further comprising means for biasing said leading blade to said closed position and for thus maintaining said leading blade in contact with said holding means at least during a portion of movement of said member from said second position to said first position; blocking means for holding said trailing blade in an open position in the second position of said member; and time delay means arranged to effect the movement of said trailing blade to a closed position and to thus complete an exposure subsequent to movement of said leading blade to said open position.

5. A combination as defined in claim 4, wherein at least said leading blade is pivotable between said open and closed positions thereof and comprises a portion extending into the path of movement of said holding means from said second position.

6. A combination as defined in claim 4, further comprising guide means for said double exposure preventing member and abutment means for holding said member in said second position thereof, said member being arranged to pivot in response to actuation of said release and to thus clear said abutment means, said means for moving said member from second position comprising resilient means which is free to move said member from second position after said member clears said abutment means.

7. A combination as defined in claim 6, further comprising arresting means arranged to engage and hold said double exposure preventing member in an intermediate position during movement of said member from second position under the action of said resilient means.

8. A combination as defined in claim 7, wherein said abutment means forms part of said film-transporting device and is rotated about a fixed axis during operation of said device, said abutment means having a substantially radial flank against which said double exposure preventing member abuts in said second position and a top land against which said member abuts in said intermediate position thereof.

9. In a photographic apparatus, a combination comprising a release actuatable to move from an idle position; a film transporting device operable to advance the film upon completion of an exposure; a double exposure preventing member movable by said device from a first position in which it prevents the actuation of said release to a second position in which it prevents the operation of said device; guide means for said member; means for moving said member from said second position in response to actuation of said release; abutment means for holding said member in said second position, said member being arranged to pivot in response to actuation of said release and to thus clear said abutment means, said means for moving said member from said second position comprising resilient means which is free to move said member from said second position after said member clears said abutment means; arresting means arranged to engage and hold said member in an intermediate position during movement of said member from said second position under the action of said resilient means, said arresting means comprising a lever and said member comprising a projection which engages a portion of said lever during movement of said member from said second position under the action of said resilient means; biasing means for urging said portion of said lever into the path of movement of said projection; shutter means including a leading blade arranged to move from a closed position to an open position in response to movement of said member from said second position and a trailing blade, said member including holding means for retaining said leading blade in said open position at least while said release is out of said idle position; blocking means for holding said trailing blade in an open position in the second position of said member; and time delay means arranged to effect the movement of said trailing blade to a closed position and to thus complete an exposure subsequent to movement of said leading blade to said open position.

10. A combination as defined in claim 9, wherein said blocking means comprises a portion arranged to disengage said portion of said lever from said projection in response to movement of said trailing blade to closed position so that said first mentioned resilient means is thereupon free to move said double exposure preventing member from said intermediate position to said first position.

11. A combination as defined in claim 1, further comprising biasing means for urging said leading blade to closed position, said holding means being disengaged from said leading blade in the second position of said double exposure preventing member so that said leading blade is free to reassume said closed position thereof.

12. A combination as defined in claim 1, wherein said holding means forms part of an articulate connection provided between said double exposure preventing member and said leading blade and arranged to hold said leading blade in closed position in the second position of said member.

13. In a photographic apparatus, a combination comprising a release actuatable to move from an idle position; a film transporting device operable to advance the film upon completion of an exposure; a double exposure preventing member movable by said device from a first position in which it prevents the actuation of said release to a second position in which it prevents the operation of said device; means for moving said member from said second position in response to actuation of said release; shutter means including a leading blade arranged to pivot from a closed position to an open position in response to movement of said member from said second position and a trailing blade, said member including holding means for retaining said leading blade in said open position at least while said release is out of said idle position, said holding means forming part of an articulate connection provided between said double exposure preventing member and said leading blade and being arranged to hold said leading blade in said closed position in said second position of said member, said holding means including a projection provided on said double exposure preventing member and having a slot and said articulate connection further comprising a pin provided on said leading blade and extending into said slot; blocking means for holding said trailing blade in an open position in said second position of said member; and time delay means arranged to effect a movement of said trailing blade to a closed position and to thus complete an exposure subsequent to the movement of said leading blade to said open position.

14. In a photographic apparatus, a combination comprising a release actuatable to move from an idle position; a film transporting device operable in advance the film upon completion of an exposure; a double exposure preventing member movable by said device from a first position in which it prevents the actuation of said release to a second position in which it prevents the operation of said device; means for moving said member from said second position in response to actuation of said release; shutter means including a leading blade arranged to move from a closed position to an open position in response to movement of said member from said second position and a trailing blade, said member including holding means for retaining said leading blade in said open position at least while said release is out of said idle position; blocking means for holding said trailing blade in an open position in the second position of said member, said blocking means comprising a lever which is pivotable to and from a blocking position in which it maintains said trailing blade in said open position and said member comprising a portion which maintains said lever in said blocking position in said second position of said member; time delay means arranged to effect a movement of said trailing blade to a closed position and to thus complete an exposure subsequent to movement of said leading blade to said open position, said time delay means comprising retaining means for temporarily holding said lever in said blocking position independently of said portion of said member subsequent to movement of said member from said second position; and means for biasing said lever from said blocking position.

15. A combination as defined in claim 14, wherein said lever comprises a first arm engaging with said trailing blade in the second position of said double exposure preventing member, a second arm operatively connected with said retaining means, and a stud extending into the path of said portion during movement of said member from the first to the second position thereof.

16. A combination as defined in claim 1, wherein said time delay means comprises an exposure control circuit.

17. A combination as defined in claim 16, wherein said circuit includes an electromagnet and wherein at least a portion of said blocking means constitutes the armature of said electromagnet.

18. A combination as defined in claim 16, wherein said circuit includes an electromagnet having an armature connected with and arranged to hold said blocking means in said blocking position in energized condition of said electromagnet.

19. A combination as defined in claim 16, wherein said circuit includes switch means and said double exposure preventing member includes a portion arranged to actuate said switch means and to thereby determine the beginning of that interval during which said time delay means prevents movement of said trailing blade to closed position subsequent to movement of said member from second position.

20. A combination as defined in claim 16, wherein said circuit includes master switch means arranged to close in response to movement of said release from idle position and electromagnet means energizable on closing of said master switch means for an interval of time which is a function of scene brightness and to thereby prevent movement of said blocking means from said blocking position.

21. A combination as defined in claim 20, wherein said circuit further comprises auxiliary switch means in parallel with said master switch means and arranged to close in response to and to remain closed during energization of said electromagnet means so that the latter can remain energized on return movement of said release to idle position and on resulting opening of said master switch means.

22. A combination as defined in claim 1, wherein said blades are pivotable between open and closed positions, said leading blade being arranged to pivot in a first direction during movement from closed position and said trailing blade being arranged to pivot in a second direction during movement to closed position.

23. A combination as defined in claim 1, wherein said blades are pivotable between open and closed positions, said leading blade being arranged to pivot in a predetermined direction from said closed position thereof and said trailing blade being arranged to pivot in said predetermined direction to said closed position thereof.

24. In a photographic apparatus, a combination comprising a release actuatable to move from an idle position; a film-transporting device operable to advance the film upon completion of an exposure; a double exposure preventing member movable by said device from a first position in which it prevents the actuation of said release to a second position in which it prevents the operation of said device; means for moving said member from said second position in response to actuation of said release; shutter means including a leading blade arranged to move from a closed position to an open position in response to movement of said member from said second position and a trailing blade, said member including holding means for retaining said leading blade in said open position at least while said release is out of said idle position; blocking means for holding said trailing blade in an open position in said second position of said member, said holding means being arranged to move said trailing blade to said open position in response to movement of said member to said second position; and time delay means arranged to effect the movement of said trailing blade to a closed position and to thus complete an exposure subsequent to movement of said leading blade to said open position.

* * * * *